United States Patent
Baldwin et al.

(10) Patent No.: US 9,230,117 B2
(45) Date of Patent: *Jan. 5, 2016

(54) APPROVAL OF CONTENT UPDATES

(71) Applicant: International Business Machines Corporation, Armonk, NY (US)

(72) Inventors: Nicholas A. Baldwin, Gladesville (AU); Mark C. Hampton, Carlton (AU); Eric Martinez de Morentin, Manly (AU); Prescilla Prescilla, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,157

(22) Filed: Aug. 25, 2014

(65) Prior Publication Data

US 2014/0373089 A1    Dec. 18, 2014

Related U.S. Application Data

(63) Continuation of application No. 13/845,375, filed on Mar. 18, 2013.

(51) Int. Cl.
  *G06F 21/60* (2013.01)
  *G06F 21/62* (2013.01)
  *G06Q 10/06* (2012.01)
  *G06Q 10/10* (2012.01)

(52) U.S. Cl.
  CPC ............. *G06F 21/60* (2013.01); *G06F 21/62* (2013.01); *G06Q 10/0633* (2013.01); *G06Q 10/1093* (2013.01)

(58) Field of Classification Search
  CPC ..... G06F 21/60; G06F 21/62; G06Q 10/0633; G06Q 10/1093
  See application file for complete search history.

(56) References Cited

U.S. PATENT DOCUMENTS 6,701,454 B1    3/2004    Fischer et al.
8,132,092 B2    3/2012    Edd et al.
(Continued)

FOREIGN PATENT DOCUMENTS

CN    10162610 A    6/2010
WO    2001088757 A1    11/2001
WO    2008093363 A2    8/2008

OTHER PUBLICATIONS

IBM List of Patents or Patent Applications to be Treated as Related (for Examiner Information only) dated Mar. 31, 2015, pp. 1-2.
(Continued)

*Primary Examiner* — Chau Le
*Assistant Examiner* — Muhammad Chaudhry
(74) *Attorney, Agent, or Firm* — Holland & Knight LLP; Brian J. Colandreo, Esq.; Jeffrey T. Placker, Esq.

(57) ABSTRACT

A method, computer program product, and system is described. An indication of a problem regarding a content item is received, the content item being subject to a workflow including an approval protocol. A request for an emergency exception to the workflow with respect to an update to the content item is received, the update being associated with the problem. Permission for circumvention of one or more aspects of the approval protocol with respect to the update is provided, in response to receiving the request for the emergency exception.

5 Claims, 3 Drawing Sheets

(56) References Cited

U.S. PATENT DOCUMENTS

| | | | |
|---|---|---|---|
| 8,645,697 | B1 | 2/2014 | Emigh et al. |
| 8,793,509 | B1 | 7/2014 | Nelson et al. |
| 8,875,252 | B2 | 10/2014 | Belton et al. |
| 2003/0172280 | A1 | 9/2003 | Scheidt et al. |
| 2007/0100892 | A1* | 5/2007 | Kephart et al. ............... 707/200 |
| 2008/0016022 | A1* | 1/2008 | Holt .................. 707/1 |
| 2009/0240907 | A1 | 9/2009 | Crandell |
| 2011/0166883 | A1 | 7/2011 | Palmer et al. |
| 2012/0227087 | A1 | 9/2012 | Brown et al. |
| 2013/0055074 | A1 | 2/2013 | Trese et al. |

OTHER PUBLICATIONS

"Workspace Example Scenario: Emergency Fixes," http://publib.boulder.ibm.com/infocenter/wchelp/v7r0m0/index.jsp?topic=%2Fcom.ibm.commerce.workspaces.doc%2Frefs%2Frwoscenario_emergency_fix.htm, downloaded on Mar. 13, 2013, pp. 1-3.

"Change Management Process," Northwestern University Information Technology, http://www.it.northwestern.edu/bin/docs/service-manager/ChangeManagementProcess2.7.pdf, Jun. 1, 2011, Version 2.7, downloaded Mar. 13, 2013, pp. 1-24.

"JCU Web Content Workflow," http://www.google.co.in/url?sa=t&rct=j&q=EDITING+OR+CHANGING+OF+PUBLISHED+CONTENT+ITEM+WITH+review+and+approval+steps&source=web&cd=4%cad=rja&ved=0CFIQFjAD&url=http%3A%2F%2Fwww.jcu.edu.au%2Fwebdev%2Fstatic%2FJCU%2520Web%2520Content%2520Workflow_LatestReleased_1_JCU_085733.docx&ei=nkkzUKy0FcrQrQfTg4Bw&usg=AFQjCNEGK9yHJOZrzm4qJFZKkB6T1C9duw, downloaded Mar. 13, 2013, pp. 1-8.

"The Document Review Process: Automation of Your Document Review and Approval, A White Paper," BP Logix, Inc., http://www.bplogix.com/docs/imarkup_document_review.pdf, downloaded Mar. 13, 2013, pp. 1-12.

* cited by examiner

APPROVAL OF CONTENT UPDATES

RELATED APPLICATIONS

The subject application is a continuation application of U.S. patent application with Ser. No. 13/845,375, filed on Mar. 18, 2013, the entire content of which is herein incorporated by reference.

TECHNICAL FIELD

This disclosure relates to workflow management.

BACKGROUND

A workflow management application (or process) may facilitate the management of workflow for particular content items (e.g., a document, a webpage, a software code segment, and so on) and/or modifications to content items. For example, a workflow management application may be configured to assist in creating, modifying, approving, publishing, or deleting content items, management of various aspects of these tasks, and various other workflow-related functionality. A workflow management application may, for example, facilitate saving of one or more versions of a content item and/or notifying content authors and/or content reviewers or approvers of various assignments, statuses, upcoming events (e.g., due dates), and so on. As such, for example, a workflow management application may generally facilitate the flow of content items and information (e.g., information regarding particular tasks or events) in a workflow system. A workflow management application (or process) may include, in certain instances, a web content management application (e.g., an application that facilitate the management of documents, such as webpages, that available over various networks, including the internet, corporate intranets, and so on) and or various related functionality Content approval may refer to the process through which approval of a particular content item (and/or revisions thereto) may be managed. A content item (or "content") may be a file or other representation of information, such as a document, a webpage, a presentation, and so on. It may be desirable, for example, in various settings, to obtain approval from one or more designated individuals for a particular content item before publishing the content (and/or otherwise advancing the content through various stages of a workflow such as creation, refinement, distribution, and so on). In certain instances, it may be appropriate to obtain tiered approval for a content item (e.g., approval from a series of individuals, with the content item being submitted to the next approver(s) in the series based upon receiving approval from the preceding approver(s) in the series).

BRIEF SUMMARY OF THE DISCLOSURE

According to one aspect of the disclosure, a computer-implemented method includes receiving, by one or more computing devices, an indication of a problem regarding a content item, the content item being subject to a workflow including an approval protocol. The method includes receiving, by the one or more computing devices, a request for an emergency exception to the workflow with respect to an update to the content item, the update being associated with the problem. The method includes providing, by the one or more computing devices, permission for circumvention of one or more aspects of the approval protocol with respect to the update, in response to receiving the request for the emergency exception.

One or more of the following features may be included. The method may include providing a notification of the permission to an administrator associated with the workflow. The method may include revoking the permission based upon, at least in part, receiving an indication that the administrator has requested revocation of the permission. The method may include publishing the update, wherein the one or more aspects of the approval protocol are circumvented in accordance with the provided permission. The method may include providing a notification of the publishing of the update to an administrator associated with the workflow. The method may include revoking the publishing based upon, at least in part, receiving an indication that the administrator has requested revocation of the publishing. The permission may be provided based upon, at least in part, a calendar-based rule. The permission may be provided based upon, at least in part, identifying an individual associated with the request. The permission may be provided based upon, at least in part, a type of the content item. The permission may be provided based upon, at least in part, a type of the update to the content item.

According to another aspect of the disclosure, a computer program product resides on a computer readable storage medium that has a plurality of instructions stored on it. When executed by a processor, the instructions cause a processor to perform operations including receiving an indication of a problem regarding a content item, the content item being subject to a workflow including an approval protocol. The operations include receiving a request for an emergency exception to the workflow with respect to an update to the content item, the update being associated with the problem. The operations include providing permission for circumvention of one or more aspects of the approval protocol with respect to the update, in response to receiving the request for the emergency exception.

One or more of the following features may be included. The operations may include providing a notification of the permission to an administrator associated with the workflow. The operations may include revoking the permission based upon, at least in part, receiving an indication that the administrator has requested revocation of the permission. The operations may include publishing the update, wherein the one or more aspects of the approval protocol are circumvented in accordance with the provided permission. The operations may include providing a notification of the publishing of the update to an administrator associated with the workflow. The operations may include revoking the publishing based upon, at least in part, receiving an indication that the administrator has requested revocation of the publishing. The permission may be provided based upon, at least in part, a calendar-based rule. The permission may be provided based upon, at least in part, identifying an individual associated with the request. The permission may be provided based upon, at least in part, one or more of a type of the content item and a type of the update to the content item.

According to another aspect of the disclosure, a computing system includes one or more processor devices and one or more memory architectures coupled with the one or more processor devices. The one or more processor devices are configured to receive an indication of a problem regarding a content item, the content item being subject to a workflow including an approval protocol. The one or more processor devices are configured to receive a request for an emergency exception to the workflow with respect to an update to the content item, the update being associated with the problem. The one or more processor devices are configured to provide permission for circumvention of one or more aspects of the approval protocol with respect to the update, in response to receiving the request for the emergency exception.

One or more of the following features may be included. The one or more processor devices may be configured to provide a notification of the permission to an administrator associated with the workflow. The one or more processor devices may be configured to revoke the permission based upon, at least in part, receiving an indication that the administrator has requested revocation of the permission. The one or more processor devices may be configured to publish the update wherein the one or more aspects of the approval protocol are circumvented in accordance with the provided permission. The one or more processor devices may be configured to provide a notification of the publishing of the update to an administrator associated with the workflow. The one or more processor devices may be configured to revoke the publishing based upon, at least in part, receiving an indication that the administrator has requested revocation of the publishing. The permission may be provided based upon, at least in part, one or more of a calendar-based rule, a type of the content item, a type of the update to the content item, and identifying an individual associated with the request.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
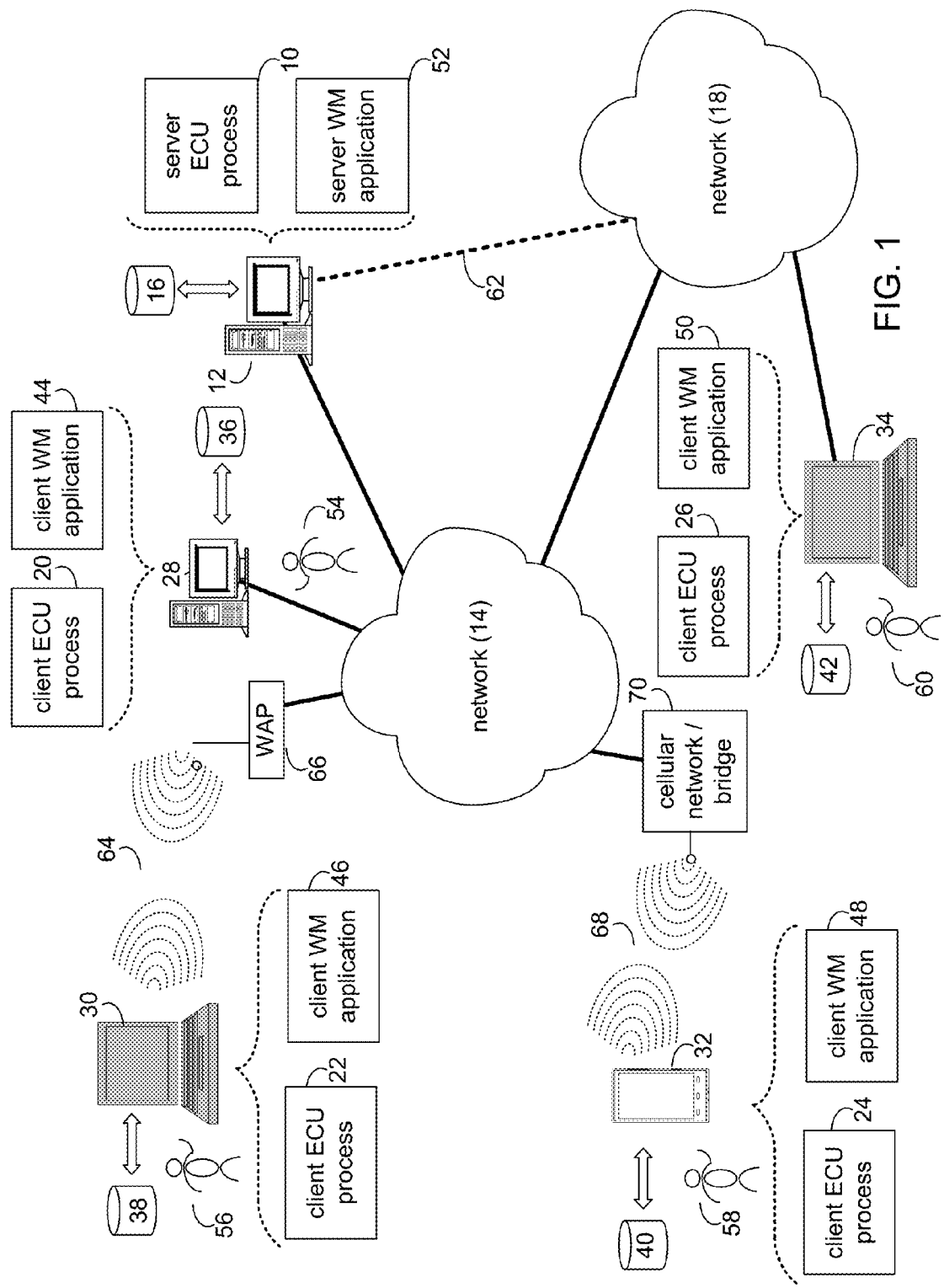
FIG. 1 is a diagrammatic view of an Emergency Content Update process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A workflow management application (or process) may facilitate the management of workflow for particular content items (e.g., a document, a webpage, a software code segment, and so on) and/or modifications to content items. For example, a workflow management application may be configured to assist in creating, modifying, approving, publishing, or deleting content items, management of various aspects of these tasks, and various other workflow-related functionality. A workflow management application may, for example, facilitate saving of one or more versions of a content item (e.g., to a storage device associated with the workflow management application), notifying content authors and/or content reviewers or approvers of various assignments, statuses, upcoming events (e.g., due dates), publishing the content item, and so on. As such, for example, a workflow management application may generally facilitate the flow of information (e.g., information regarding particular tasks or events) in a workflow system.

A workflow management application (or process) may include, in certain instances, web content management functionality (e.g., functionality facilitating the management of documents, such as webpages, that may be available over various networks, including the internet, corporate intranets, and so on.)

Content approval may refer to the process through which approval of a particular content item (and/or revisions thereto) may be managed (e.g., as part of a workflow). It may be desirable, for example, in various settings, to obtain approval from designated individuals for a particular content item before publishing the content (and/or otherwise advancing the content through various stages of creation, refinement, distribution, and so on). In certain instances, it may be appropriate to obtain "tiered" or "serial" approval (i.e., approval from a series of individuals, with the content being submitted to the next approver(s) in the series based upon receiving approval from the preceding approver(s) in the series). It will be understood that a content item (or "content") may be a file or other representation of information, such as a document, a webpage, a presentation, software code segment, and so on. Various examples discussed herein may include web content, such as web pages or other documents available over various networks. However, it will be understood that the various functionality of the described processes/systems may similarly apply to various other types of content items.

In certain instances, it may be necessary to publish "emergency" updates to content items. (As used herein, an "update" to a content item may include a revision to or replacement of a portion of an existing content item and/or the introduction of an entirely new content item.) An "emergency" update may, for example, describe a circumstance in which an update to a content item is necessary (e.g., because of some identified deficiency in previously-published content items) but in which the nature of the necessary update and/or the associated timing considerations may render processing of updates through the normal associated workflow undesirable. For example, due to a pressing need to create and/or modify a content item (e.g., a need to fix an error on a publicly available webpage), there may not be sufficient time available for compliance with a normal approval workflow for the content item (e.g., the submission of the item to a designated set of reviewers for approval) before the content item may need to be published. (It will be understood that "to publish," as used herein, may mean to make a content item available to a particular set of individuals other than creators and/or approvers of the item. For example, a web page may be "published" when it is made available to the general public over the internet or employees of a corporation over a corporate intranet.)

In certain embodiments, it may be useful to provide a process (or system, and so on) by which aspects of a relevant workflow for a content item (e.g., a required sequence of approval from various approvers) may be circumvented, in light of the emergency nature of a particular update to a particular content item. An Emergency Content Update ("ECU") process (or application, and so on) may provide this and/or various other functionality. For example, an ECU process may facilitate a content author (and/or other individual) temporarily circumventing a normal approval process (e.g., as specified by a relevant workflow, such as a workflow associated with a web content management application) in order to quickly publish an emergency update to a content item (e.g., webpage content). In certain embodiments, an ECU process may additionally/alternatively facilitate revocation of permission to circumvent an approval process (e.g., at the request of an administrator) before and/or after publication of a content update, and/or may facilitate review of a content item update by relevant reviewers (e.g., reviewers associated with the circumvented approval process) before and/or after publication of the content update.

Referring now to FIG. 1, an ECU process may be coupled to a computer or computer network. For example, server ECU process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server ECU process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client ECU processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client ECU processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the ECU process may be a server-side process (e.g., which may be implemented via server ECU process 10), in which all of the functionality of the ECU process may be executed on a server computer (e.g., server computer 12). In an embodiment, the ECU process may be a client-side process (e.g., which may be implemented via one or more of client ECU processes 20, 22, 24, 26), in which all of the functionality of the ECU process may be executed on a client computing device (e.g., one or more of client electronic devices 28, 30, 32, 34). In an embodiment, the ECU process may be a hybrid server-client process (e.g., which may be implemented by server ECU process 10 and one or more of client ECU processes 20, 22, 24, 26), in which at least a portion of the functionality of the ECU process may be implemented via server computer 12 and at least a portion of the functionality of the ECU process may be implemented via one or more client computing devices (e.g., one or more of client electronic devices 28, 30, 32, 34).

In certain embodiments, an ECU process may be a stand-alone process. In certain embodiments, an ECU process may operate as part of, or in conjunction with, one or more other processes and/or may include one or more other processes. For example, in certain embodiments, an ECU process may be included in (or may operate in conjunction with) a Workflow Management ("WM") application (or process), which may generally facilitate the management of workflow for particular content items (e.g., a document, a webpage, a software code segment, and so on) and/or modifications to content items. For example, as also noted above, a workflow management application may be configured to assist in creating, modifying, approving, publishing, or deleting content items, management of various aspects of these tasks, and various other workflow-related functionality. A WM application may, for example, facilitate saving of one or more versions of a content item and/or notifying content authors and/or content reviewers or approvers of various assignments, statuses, upcoming events (e.g., due dates), and so on. As such, for example, a WM application may generally facilitate the flow of information (e.g., information regarding particular tasks or events) in a workflow system. In certain embodiments, a WM application may include (and/or be associated with) a web content management system, which may facilitate the management of web documents (e.g., webpages) that may be published for consumption over various networks, including the internet, corporate intranets, and so on.

A WM application (or process) may operate (and/or reside) on a client device (e.g., client WM application 44, operating on client electronic device 28; client application WM 46, operating on client electronic device 30; client WM application 48, operating on client electronic device 32; or client WM application 50, operating on client electronic device 34). A client ECU process (e.g., client ECU process 20) or a server ECU process (e.g., server ECU process 10) may be in communication with a client WM application (e.g., client WM application 44) or may be part of a client WM application.

A WM application may additionally/alternatively operate (and/or reside) on a server device (e.g., server WM application 52, operating on server computer 12 or another server WM application (not shown), operating on another server computer (not shown)). A server ECU process (e.g., server ECU process 10) or a client ECU process (e.g., client ECU process 20) may be in communication with a server WM application (e.g., server WM application 52) or may be a part of a server WM application.

Users 54, 56, 58, 60 may access an ECU process in various ways. For example, these users may access server ECU process 10 directly through the device on which a client process (e.g., client ECU processes 20, 22, 24, 26) is executed, namely client electronic devices 28, 30, 32, 34. Users 54, 56, 58, 60 may access server ECU process 10 directly through network 14 and/or through secondary network 18. Further, server computer 12 (i.e., the computer that executes server ECU process 10) may be connected to network 14 through secondary network 18, as illustrated with phantom link line 62. Users 54, 56, 58, 60 may also access a client or server WM application (or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client ECU process 20 will be described for illustrative purposes. It will be understood that client ECU process 20 may, for example, interact and/or communicate with a server ECU process such as server ECU process 10 and/or may be executed within one or more applications that allow for communication with other server and/or client ECU processes. This is not intended to be a limitation of this disclosure, as other configurations are possible (e.g., ECU process 20 may include stand-alone client processes and/or stand-alone server processes). For example, some implementations may include one or more of client ECU processes 22, 24, 26 or server ECU process 10 in place of or in addition to client ECU process 20.

Figure 2:
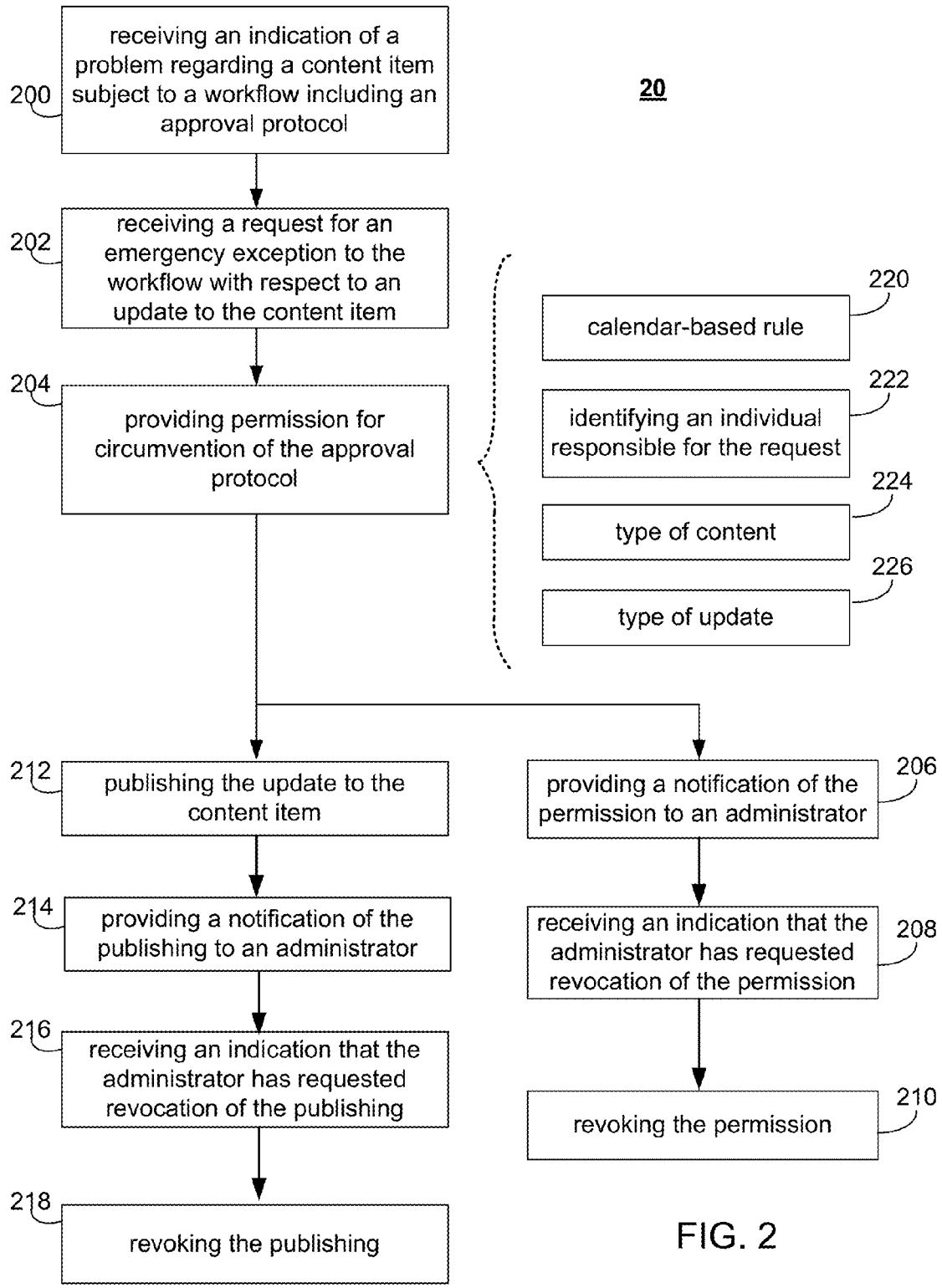
FIG. 2 is a flowchart of a process executed by the Emergency Content Update process of FIG. 1.

Referring now also to FIG. 2, there is shown a diagrammatic view of an example process that may be implemented by an ECU process, e.g., client ECU process 20. Client ECU process 20 may receive 200 an indication of a problem regarding a content item. As also noted above, a content item may be a document, a webpage, a software code segment, a file, one or more portions of these items, and so on. A problem may take a variety of forms, including the inclusion of misleading or incorrect information in a content item, an issue with the appearance or functionality of a content item (and/or a related feature), a typographical error or misprint associated with a content item, and so on.

ECU process 20 may receive 200 an indication of a problem with a content item in a variety of ways, including through a user input from a variety of individuals. For example, in certain embodiments, ECU process 20 (and/or a related process or application, such as WM application 44) may automatically detect one or more problems associated with a content item and may, for example, provide an alert to an administrator or other individual indicating the detected problem. In certain embodiments, an administrator or other individual may identify a problem with a content item and may indicate the problem to ECU process 20 (and/or a related process or application, such as WM application 44) via one or more user inputs. For example, a content owner may review a web page in order to identify various problems with the web page (e.g., typographical errors, erroneous information, faulty functionality, and so on) and may indicate with various levels of specificity (e.g., through a user input via WM application 44) the presence of these errors.

In certain embodiments, the content item for which a problem has been identified may be subject to a workflow, including an approval protocol. As also described above, a workflow may include various steps, functionality, or other aspects relating to creating, modifying, approving, publishing, or deleting content items, management of various aspects of these tasks, and various other workflow-related functionality. An approval protocol may be one or more requirements, steps, processes or other requirements that may be associated with approval of a content item (e.g., as specified in a relevant workflow). In certain embodiments, for example, a workflow for a particular content item may include the requirement that one or more approvers (including, for example, a specific and ordered series of approvers) provide approval of a content item (and/or any updates thereto) before the content item may be published and/or otherwise advanced through the workflow.

ECU process 20 may receive 202 a request for an emergency exception to a workflow with respect to an update to a content item, wherein the update is associated with the problem. For example, a user may identify a problem with a content item that may require an emergency update to the content item (e.g., an update that may not be possible to implement in a timely manner if a related approval protocol is strictly followed). In order to request an exception to the workflow (e.g., with respect to the relevant approval protocol), the user may accordingly select a particular icon or action button in a user interface of a WM application associated with the content item (e.g., a web content management application) in order to request an emergency exception to the relevant workflow with respect to an update intended to address the identified problem. For example, a WM application (such as a web content management application) may include an "Emergency Fix" button or icon (or similar user interface component), which a user may select (alone or in connection with the selection or other identification of the relevant content item, problem, and so on) in order to request an emergency exception to a workflow. In this way (and/or other ways), a user may, for example, indicate that an update to a content item may be required in order to fix an identified problem, and that the update may require an exception to the normal workflow for such an update (or content item) in order to be timely completed (e.g., timely published).

It will be understood that "emergency," as used herein, may refer to problems of varying severity. In general, "emergency," as used herein, may refer to a problem for which time may be of the essence. As such, for example, an emergency update may be an update for which there may not be sufficient time for a usual approval protocol to be implemented/followed. It will be understood, however, that whether or not an emergency condition applies may depend on a various factors including the timing of a problem, the relevant individuals, groups, organizations, or projects associated with a problem or content item, and/or various other factors relating to a problem, content item, workflow, and so on.

In certain embodiments, a user requesting an emergency exception may be the intended author of the relevant update. In certain embodiments, a user requesting an emergency exception may be an administrator, such as a designated owner/custodian of the content item, a supervisor or other manager, an administrator of a relevant workflow process, an approver associated with the relevant workflow or content item, and so on. (It will be understood, however, that although many of the examples herein discuss various user inputs, in certain embodiments ECU process 20 may receive 202 a request for an emergency exception—and/or execute various other functionality—based upon automated input(s) in addition/as an alternative to user input(s).)

In certain embodiments, a received 202 request may include additional information beyond simply a request to circumvent an aspect of a relevant workflow (such as, for example, an aspect of a related approval protocol). For example, a received 202 request may include information associated with the type of update contemplated, the proposed author(s) of the update, a classification of the emergency (e.g., the severity of the emergency, the business units or projects to which the emergency relates, and so on), and/or various other types of information associated with the content item, the relevant workflow (including the relevant approval protocol), the proposed update, and so on. For example, continuing the discussion above, upon clicking the "Emergency Fix" button, a user may be presented with a dialog box facilitating input of various relevant information such as the nature of the problem, the proposed update, the proposed author of the update, the proposed timing of the update, and so on.

In certain embodiments, ECU process 20 may receive 200 an indication of a problem with a content item as part of receiving 202 a request for an emergency exception to a related workflow. For example, a user may identify a problem with a content item through visual inspection of the content item and may both indicate the problem and request an exception to the relevant workflow as part of a single input (and/or multiple related inputs). In certain embodiments, ECU process 20 may receive 200 an indication of a problem with a content item separately from receiving 202 a request for an emergency exception to a related workflow. For example, in certain embodiments one user (e.g., a content author) may indicate a problem with a content item and another user (e.g., an administrator) may request an emergency exception to a related workflow, or a single user may separately indicate the existence of a problem (e.g., by highlighting the relevant portion of the content item) and request an emergency exception relating to that problem.

ECU process 20 may provide 204 permission for circumvention of one or more aspects of the approval protocol with respect to the update, in response to receiving 202 the request for the emergency exception. For example, ECU process 20 may provide 204 permission for an update to a content item (the update being related to an identified problem) to be published without first being approved by one or more approvers, although such approval may be required as part of a relevant non-emergency approval protocol. Such permission may be provided 204 in a variety of ways. For example, in certain embodiments aspects of the workflow (e.g., aspects of an approval protocol) may be temporarily suspended with respect to the relevant content item and an associated WM application, thereby allowing a user to proceed with an update without submitting to the suspended aspects of the workflow. In certain embodiments, an electronic "ticket" or "token" may be issued to relevant individuals (e.g., relevant authors) indicating permission to circumvent aspects of a relevant approval protocol. As such, for example, until such a ticket or token is revoked, a WM application (and/or other application or process) may permit the relevant individuals to publish updates to relevant content items (and/or engage in other related activities) without submitting such publication (and/or other activities) to a normal approval protocol.

In certain embodiments, the provided 204 permission for circumvention of one or more aspects of an approval protocol may relate to whether an author of an emergency update is allowed to edit a content item at all (e.g., in addition/as an alternative to whether the author may publish any edits). For example, in certain embodiments, unless appropriate permission is provided 204, a particular content author may not be authorized (i.e., under a relevant approval protocol) to make any edits to a particular content item.

In certain embodiments, the provided 204 permission may allow circumvention of only a portion of the relevant approval protocol. For example, with respect to a particular content item, the ordinary approval protocol may require approval of updates by five approvers in sequence. In certain embodiments, the provided 204 permission may permit publication of an emergency update with respect to the content item after approval by only one (or more) of the five approvers, thereby allowing publication on an expedited basis while still assuring that some approval is required. Similarly, in certain embodiments, a provided 204 permission to circumvent an aspect of an approval protocol may include a requirement that an alternative approval protocol be substituted for the original approval protocol. For example, an organization may designate certain "emergency approvers," who may be on call at various times with respect to various types of content items and/or content items problems. As such, if an emergency update is necessary for a particular content item, providing 204 permission to circumvent the usual approval protocol for that content item may include requiring that one of these emergency approvers (and/or one or more other approvers) still approve the update.

In certain embodiments, the provided 204 permission may be a permission for a temporary (rather than permanent) circumvention of aspects of an approval protocol. For example, as discussed in further detail below, although ECU process 20 may facilitate publication of an emergency update without submission of the update to a normal approval protocol, ECU process 20 may further facilitate providing any published update to relevant approvers (e.g., approvers associated with the circumvented approval protocol) for after-publication (and/or other) review (e.g., in accordance with various aspects of the previously-circumvented approval protocol). This may be useful, for example, in that providing 204 permission for temporary circumvention of aspects of an approval protocol may facilitate timely updates to content items (e.g., as required in an emergency) while also ensuring that an eventual review of the update still occurs in relative accordance with the approval protocol. For example, this may be useful if an important update to a content item is immediately required outside of normal business hours, when each approver associated with an approval protocol may not be available. Based upon the provided 204 permission, an update may be provided in a timely manner, without being immediately subjected to the relevant approval protocol. However, as also discussed below, the update may then later (e.g., after publication) be subjected to an appropriate approval protocol (e.g., a protocol similar to the circumvented protocol, except with regard to the post-publication timing) in order to balance the need to provide the update promptly and the need to ensure that all updates are appropriately reviewed.

In certain embodiments, ECU process 20 may provide 204 permission to circumvent an approval protocol to an individual other than the individual from whom a request for an emergency exception was received 202. For example, in certain embodiments an administrator (or another individual) may identify a problem requiring an emergency update and may accordingly request an emergency exception to the relevant workflow. The administrator, however, may intend that a different individual act as the author of the relevant emergency update (e.g., as indicated by an input associated with the administrator's request for an emergency exception). Accordingly, for example, ECU process 20 may receive 202 a request for the emergency exception from the administrator and may provide 204 permission for circumvention of the relevant approval protocol to a different individual (e.g., the content author identified by the administrator). Similarly, in certain embodiments ECU process 20 may generally provide 204 permission with respect to a particular update rather than with respect to a particular author or administrator. For example, ECU process 20 may provide 204 permission by associating a ticket with the content item (and/or identified problem) that is associated with a received 202 request, thereby facilitating circumvention of aspects of a relevant approval protocol by whatever content author eventually creates the relevant update.

In certain embodiments, ECU process 20 may provide 204 permission to circumvent an approval protocol in a limited way, such as only on a temporary basis, only with respect to a particular individual and/or change, only until after the emergency update has been published, and so on. For example, in certain embodiments, the provided 204 permission may apply only with respect to a single requested emergency update, such that the normal workflow (e.g., the normal sequence of approval) for a particular content item or update thereto may be unchanged with respect to situations besides the present emergency. Similarly, in certain embodiments, the provided 204 permission may facilitate circumventing normal workflow (e.g., sequence of approvers) for an update to a content item until after the update has been published (and/or another relevant event has occurred), at which point the workflow may be reinstated. For example, the provided 204 permission may facilitate publication of an emergency update without subjecting the update to a normal sequence of approval, but such approval may still be required for the update after publication (and/or at another time). For example, if such post-publication (or other) approval is not received in a timely manner, the publication of the content item update may be revoked (i.e., the update may be removed from publication based upon not receiving appropriate (post-publication) approval).

ECU process 20 may provide 206 a notification of the provided 204 permission to one or more administrators associated with the workflow. As noted above, an administrator may be a designated owner/custodian of the content item, a supervisor or other manager, an administrator of a relevant workflow process, an approver associated with the relevant workflow or content item, and so on. For example, in order to ensure that appropriate review of emergency updates may occur, ECU process 20 may provide 206, to appropriate individuals such as approvers designated by the circumvented approval protocol, one or more notifications that permission for an emergency update (i.e., circumvention of aspects of a relevant approval protocol) may have been provided 204. Notification may be provided 206 by a variety of means, such as email, text message and so on. Additionally/alternatively, a provided 206 notification may include various information relating to the received 202 request and/or the provided 204 permission, such as the identity or other characteristics of the content item, the nature of the desired update, the nature of the problem or emergency, the identity of the individual who has requested the exception, the identity of the author of the update, and so on.

Providing 206 a notification of the provision 204 of permission to circumvent an approval protocol may be useful for example, as it may alert relevant managers, approvers, and/or other individuals that an emergency update may be in progress and may allow such individuals, as appropriate, to provide an indication that they do not approve of the permission having been provided 204. For example, in response to providing 206 a notification of the provided 204 permission, ECU process 20 may receive 208 an indication that a notified administrator has requested revocation of the permission. For example, upon receiving a notification that permission for an emergency update has been provided 204 with respect to a particular content item, with respect to a particular content author, and so on, an administrator may decide, for various reasons, that it may not be appropriate to circumvent the relevant approval protocol for that content item, content author, and so on. For example, an administrator may not approve of the particular author of the update publishing content without appropriate approval, the administrator may not approve of any updates to a particular content item (or of a particular type, and so on) being published without appropriate approval, the administrator may not view the situation as appropriately qualifying as an emergency, the administrator may not view the identified problem as actually requiring correction, and so on. As such, for example, an administrator may provide an input in various forms (e.g., through a WM application) that may indicate to ECU process 20 that the administrator desires to revoke the provided 204 permission.

As appropriate, based upon receiving 208 an indication that an administrator has requested revocation of the provided 204 permission, ECU process 20 may revoke 210 the provided 204 permission. For example, if permission has been provided 204 through the granting of an electronic "ticket" or "token," ECU process 20 may revoke the validity of the granted ticket or token, thereby revoking the permission to circumvent the approval protocol. In certain embodiments, ECU process 20 may partially revoke 210 the provided 204 permission. For example, an originally provided 204 permission may include permission to publish an update without any approval, even though the normal approval protocol for a non-emergency update of the relevant content item may include required approval by a series of four approvers. Based upon, for example, receiving 208 an input from an administrator (e.g., in response to a provided 206 notification), ECU process 20, in certain embodiments, may revoke 210 the provided 204 permission, but only with respect to the circumvention of one of the approvers included in the normal approval protocol. For example, ECU process 20 may maintain the previously provided 204 permission to circumvent three of the four approvers in the approval protocol, thereby permitting emergency publication of the update after (a truncated) approval protocol implicating only one of the original four approvers. In this way, for example, publication of the emergency update may be accelerated, with respect to the normal approval protocol, but some approval may still be required before publication may be permitted.

It will be understood that, in certain embodiments, only certain administrators may have the authority to request revocation of a provided 204 permission. For example, in certain embodiments, a notification may be provided 206 to the owner of a content item, the various approvers of updates to the content item under the circumvented approval protocol, the supervisor of the author of the update, and/or various other administrators. However, only certain of the notified administrators (e.g., the content owner and the supervisor of the author) may be authorized to request revocation of the provided 204 permission.

ECU process 20 may (if, for example, the provided 204 permission is not revoked 210) publish 212 the update to the content item. (As also noted above, "to publish," as used herein, may mean to make a content item available to a particular set of individuals other than creators and/or approvers of the item. For example, a web page may be "published" when it is made available—in whole or in part—to the general public over the internet or to employees of a corporation over a corporate intranet.) In publishing 212 the update, one or more aspects of the approval protocol may be circumvented in accordance with the provided 204 permission. For example, although a normal approval protocol for a workflow associated with a non-emergency update may require approval of the update by certain approvers before it is published, based upon ECU process 20 providing 204 permission for circumvention of an aspect of the approval protocol, certain emergency updates may be published 212 without one or more of the ordinarily-required approvals. In this way, for example, as also noted above, emergency updates may be published 212 in a more timely fashion than may be possible if full review/approval of the updates were to be required (i.e., if permission to circumvent aspects of the approval protocol were not provided 204).

ECU process 20 may provide 214 notification of the publishing 212 of the update to one or more administrators. As noted above, an administrator may be a designated owner/custodian of the content item, a supervisor or other manager, an administrator of a relevant workflow process, an approver associated with the relevant workflow or content item, and so on. It may be useful, accordingly, to provide 214 a notification to an administrator when an emergency update has been published. Such notification may be provided by a variety of means, such as email, text message and so on, and may include a variety of information relating to the content item, the update, associated individuals, and so on (similar to the discussion above, for example, with respect to providing 206 notifications of provided 204 permission).

Providing 214 a notification may serve a variety of purposes. For example, in certain embodiments providing 214 a notification may alert various relevant administrators that an emergency update has been published. This may be useful, for example, in order to ensure that certain administrators are aware that an identified problem has been appropriately (and timely) addressed. For example, in certain embodiments providing 214 a notification may facilitate review of the published 212 update by appropriate approvers. For example, as also noted above, the provided 204 permission for circumvention of an approval protocol may apply with respect to initial publication 212 of an update, but it may still be desirable to implement approval (e.g., in relative accordance with the circumvented approval protocol) after the update has been published 212 (and/or at various other times during the execution of ECU process 20). In this way, for example, a balance may be achieved between prompt/timely publication 212 of emergency updates (i.e., to address identified problems in a timely manner) and appropriate review of the emergency updates (i.e., to ensure that the updates meet with the approval of relevant approvers).

Based upon, for example, providing 214 a notification of publication, ECU process 20 may receive 216 an indication that the administrator has requested revocation of the publishing 212. For example, upon receiving a notification that an emergency update has been published, an administrator (e.g., an approver forming part of the circumvented approval protocol) may review the published update and may determine that the update is not satisfactory. Accordingly, the approver may provide (e.g., via an input to ECU process 20 and/or WM application 44) an indication that the update does not meet with her approval. ECU process 20 may, accordingly, revoke 218 the publishing 212 based upon the received 216 indication.

In certain embodiments, ECU process 20 may additionally/alternatively revoke 218 publication of an emergency update based upon receiving 208 an indication that an administrator has requested revocation of the provided 204 permission. For example, an administrator may have received a provided 206 notification that permission to circumvent an approval protocol has been provided 204 with respect to a particular emergency update. Upon review of this notification (and/or other relevant information), the administrator may determine that the provided 204 permission is inappropriate and may request (e.g., through an input to ECU process 20 and/or WM application 44) that the permission be revoked 210. In response to receiving 208 an indication of such a request, ECU process 20 may revoke 210 the permission accordingly. Additionally/alternatively, if, for example the content item has already been published 212 when such an indication is received 208, ECU process may similarly revoke 218 the publication based upon receiving 208 an indication that the administrator does not approve of the provided 204 permission.

ECU process 20 may revoke 218 publication in a variety of ways. For example, in certain embodiments, revocation 210 of publication may be effected through reinstatement of a previous version of a content item (e.g., the version of the content item from immediately prior to the publication 210 of the emergency update). In certain embodiments, such reinstatement may not be appropriate, however. For example, if the identified problem is a critical one it may be preferable (e.g., as determined based upon administrator input, system settings, and so on) to remove the relevant content item from publication entirely rather than simply revert to a prior draft. As such, for example, rather than causing a content item to revert to a prior version upon revoking 218 publication, ECU process 20 may cause the content item to be no longer available at all (at least with respect to a particular audience). In this way, for example, if a particular problem is particularly egregious, ECU process 20 may appropriately cause the complete removal of the content item (e.g., until a suitable correction may be made).

ECU process 20 may provide 204 permission for circumvention of aspects of the approval protocol based on a variety of factors (e.g., as may be determined based upon system settings or preferences, administrator input, and so on). For example, providing 204 permission may be based upon a calendar-based rule 220. A calendar-based rule may be a rule that is associated with a particular calendar date, clock time, span of dates and/or times, calendar event, and so on. For example, in certain embodiments ECU process 20 may provide 204 permission based upon receiving 202 a request for an emergency exception outside of business ours, during holidays, during a scheduled meeting of group managers, and so on (i.e., during times during which prompt review of an update by an approver may be unlikely).

In certain embodiments, providing 204 permission may be based upon identifying 222 an individual associated with the received 202 request. For example, ECU process 20 may determine whether to provide 204 permission based upon identifying 222 the individual requesting the permission, identifying 222 the proposed author of the update, an owner of the content, identifying 222 an approver of the content, and so on. For example, based upon various system preferences, ECU process 20 may determine that a particular content owner does not approve of emergency updates being made to his content. Accordingly, upon identifying 222 that this content owner owns the content with respect to which a request has been received 202, ECU process 20 may not provide 204 permission to circumvent approval protocol. Similarly, for example, ECU process 20 may determine that it may never be appropriate to circumvent an approval protocol (or an aspect thereof) that includes a particular individual (e.g., the company CEO). Accordingly, for example, upon identifying 222 that the particular individual may be associated with a relevant approval protocol, ECU process 20 may not provide 204 permission to circumvent the protocol.

Similarly, certain authors (or types of authors) may be generally permitted to make (and/or certain administrators or types of administrators may be permitted to successfully request) only certain types of updates. For example, in certain embodiments, marketing personnel may be permitted to author emergency updates to marketing content only, and only legal personnel of a particular rank may be permitted to author emergency updates to legal content. Accordingly, for example, ECU process 20 may take this information into account in determining whether to provide 204 permission to circumvent a relevant approval protocol.

In certain embodiments, providing 204 permission may be based upon the type 224 of the content item. For example, in certain embodiments emergency updates to particular types of content may be generally permissible, while emergency updates to other types of content may not be. For example, in certain embodiments emergency updates to the Frequently Asked Questions ("FAQ") portion of a webpage may be generally permissible, whereas emergency updates to a legal notice contained on a webpage may not be generally permissible. Similarly, for example, emergency updates may, in certain embodiments, be permissible only for press releases or media announcements, only for new content rather than old content, only for updates to old content rather than new content, and so on.

It will be understood, as used herein, that "type of content" may refer to the nature of an entire content item and/or to the nature of a particular portion of a single content item. For example, emergency updates to a particular portion of a website, such as a product description, may be generally permissible, whereas emergency updates to a different portion of the website, such as a photo of the product, may not be—in both cases, based upon a "type" (i.e., "product description" and "product photo") of content associated with the relevant website portion.

In certain embodiments, providing 204 permission may be based upon the type 226 of the emergency update. For example, ECU process 20 may provide 204 (or not provide 204) permission to circumvent an approval protocol based upon a type of change associated with the emergency update (e.g., whether the update is an edit adding material to an existing content item, an update adding entirely new content items, a deletion of material, and so on), a location of the change (e.g., whether the change relates to a particular portion of a web page, to a particular portion of an intranet architecture, and so on), and/or various other considerations concerning the type 226 of the relevant update.

It will be understood that various of the examples above (and/or other examples) relating to whether permission may be provided 204 by ECU process 20 may be applied in various combinations. For example, providing 204 permission may be based upon both the type 224 of the content item and identifying 222 the individual requesting the permission. For example, only an author identified 222 as a lawyer may be permitted to create updates of a legal type 226 to a web page. Similarly, for example, ECU process 20 may provide 204 permission based upon the combination of a calendar-based rule 220 and the type 224 of content. For example, emergency changes to an online product catalog (but not, for example, to other types 224 of content items) may be permitted only between 5 AM and 7 AM on the first Wednesday of every month, when the online catalog may be regularly scheduled to be published and emergency changes may be likely to be required.

In certain embodiments, various records with respect to the operation of ECU process 20 may be stored in a data repository (e.g., a data repository associated with a particular workflow or content item) and/or may be presented to one or more administrators (and/or other users). For example, ECU process 20 may provide to an administrator a list of emergency updates requested and/or made to a content item (and/or various associated information such as the individual(s) who requested permission to make the emergency update, the individual(s) who made the update, various aspects of the timing of such requests or updates, and so on), a record of one or more items to which emergency updates have been made, a comparison of the actual workflow implemented for an emergency change to the workflow for an item in non-emergency situations, and so on. In certain embodiments, similar (and/or other) information may be associated with a particular content item (and/or a related data repository or object). For example, ECU process 20 may associate metadata with a content item, or may edit a workflow history associated with the item, in order to record (with respect to the item) various emergency exceptions to normal workflow, any pre- and/or post-publication review of emergency updates (e.g., review by approvers associated with a normal workflow), any denials of requests for emergency exceptions, and so on.

Figure 3:
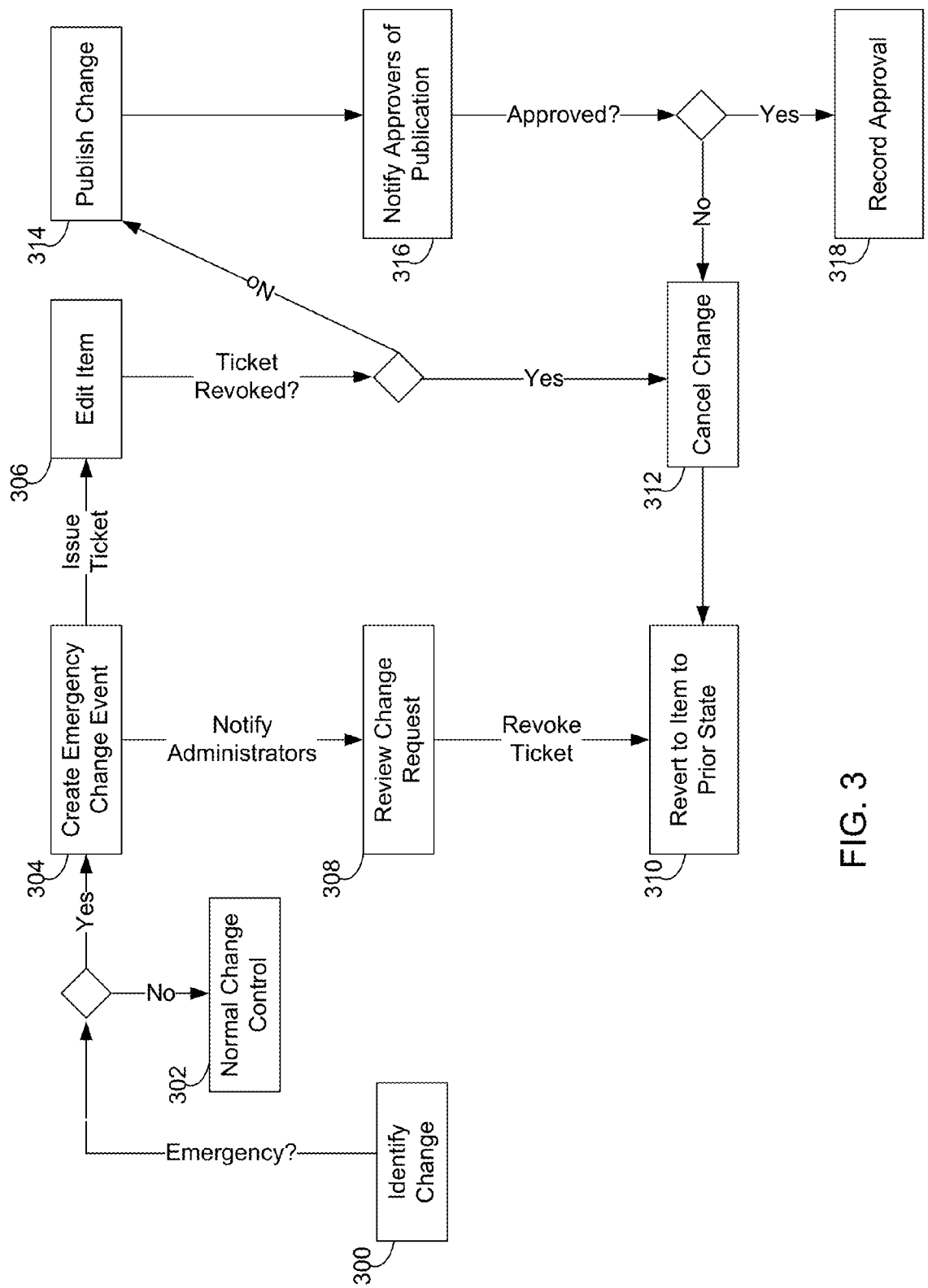
FIG. 3 is a flowchart view of a process executed by the Emergency Content Update process of FIG. 1.

Referring now also to FIG. 3, a proposed change to a content item may be identified 300. If the proposed change is not an emergency change, the normal change control process 302 may be implemented (e.g., the normal approval protocol may be enforced). If, however, the change is an emergency change, an emergency change event may be created 304. This may prompt, for example, both notification of various administrators (including various approvers) thereby facilitating review 308 of the requested emergency change, and granting of permission to execute the emergency change thereby facilitating an issuance of a ticket for the editing 306 and and/or publication of the relevant content item.

If at any point in the editing 306 of a content item a relevant ticket is revoked (e.g., based upon an administrator reviewing 308 and disapproving the emergency event, any changes made by the author may be cancelled 312 and the content item may be reverted 310 to a prior state. In certain embodiments, revocation of a ticket may also revoke access rights (e.g., as well as publication rights) with respect to a particular author and/or content item. If, however, a relevant ticket is not revoked, finalized changes to the content item may be published 314.

Upon publication 314 of the content item, various approvers (and/or other administrators) may be notified 316 of the publication. If the approvers do not appropriately approve the published 314 changes, the changes may be cancelled 312 and the content item may be reverted 310 to a prior state. If, however, the approvers do appropriately approve the published 314 changes, the approval may be recorded 318 and the publication 314 of the changed content item may be maintained.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
receiving, by one or more computing devices, an indication of a problem regarding a content item, the content item being subject to a workflow including an approval protocol, wherein the approval protocol includes approval of the content item by one or more predetermined approvers;
receiving, by the one or more computing devices, a request for an emergency exception to the workflow with respect to an update to the content item, the update being associated with the problem;
providing, by the one or more computing devices, permission for circumvention of one or more aspects of the approval protocol with respect to the update, in response to receiving the request for the emergency exception;
providing a notification of the permission for circumvention of one or more aspects of the approval protocol to an administrator associated with the workflow;
receiving an indication that the administrator has requested revocation of the permission for circumvention of one or more aspects of the approval protocol;
revoking the permission for circumvention of one or more aspects of the approval protocol based upon, at least in part, the request for revocation from the administrator;
publishing the update, wherein the one or more aspects of the approval protocol are circumvented in accordance with the provided permission;
providing a notification of the publishing of the update to an administrator associated with the workflow; and
revoking the publishing based upon, at least in part, receiving an indication that the administrator has requested revocation of the publishing.

2. The computer-implemented method of claim 1 wherein the permission is provided based upon, at least in part, a calendar-based rule.

3. The computer-implemented method of claim 1 wherein the permission is provided based upon, at least in part, identifying an individual associated with the request.

4. The computer-implemented method of claim 1 wherein the permission is provided based upon, at least in part, a type of the content item.

5. The computer-implemented method of claim 1 wherein the permission is provided based upon, at least in part, a type of the update to the content item.

* * * * *